Nov. 13, 1928.  1,691,902

J. H. PENNY

GRAIN AND SEED CLEANER

Filed March 5, 1927    3 Sheets-Sheet 1

Inventor
John H. Penny.
E. W. Anderson

By

Attorney

Nov. 13, 1928.  
J. H. PENNY  
1,691,902  
GRAIN AND SEED CLEANER  
Filed March 5, 1927 3 Sheets-Sheet 3
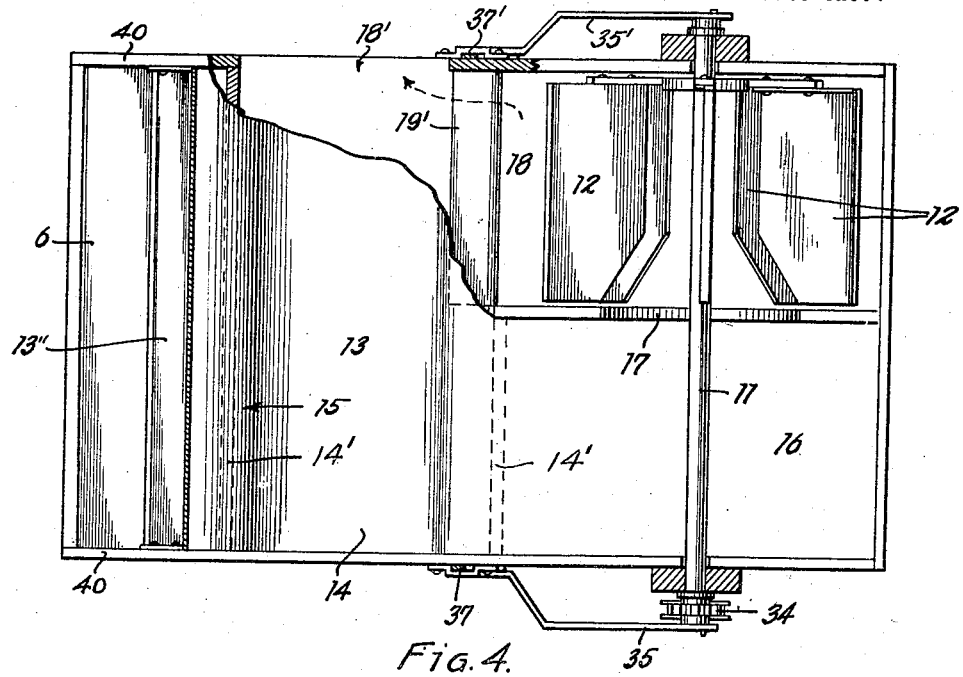
Fig. 4.
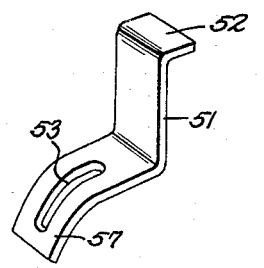
Fig. 5.
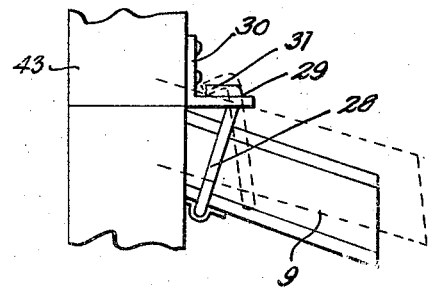
Fig. 6.
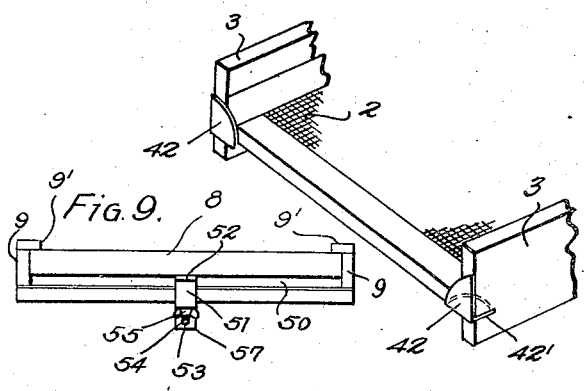
Fig. 8.
Fig. 9.
INVENTOR.
John H. Penny,
E. W. Anderson
BY
ATTORNEY.

Patented Nov. 13, 1928.

1,691,902

UNITED STATES PATENT OFFICE.

JOHN H. PENNY, OF FOUNTAIN CITY, INDIANA.

GRAIN AND SEED CLEANER.

Application filed March 5, 1927. Serial No. 173,064.

The invention has relation to grain and seed cleaners, having for an object to provide an efficient machine for this purpose wherein the upper half of the fan casing or drum may be removed readily to facilitate cleaning and repairs. Other objects and advantages will hereinafter appear.

The invention consists in the novel construction and combinations of parts as set forth in the appended claims.

Figure 1:
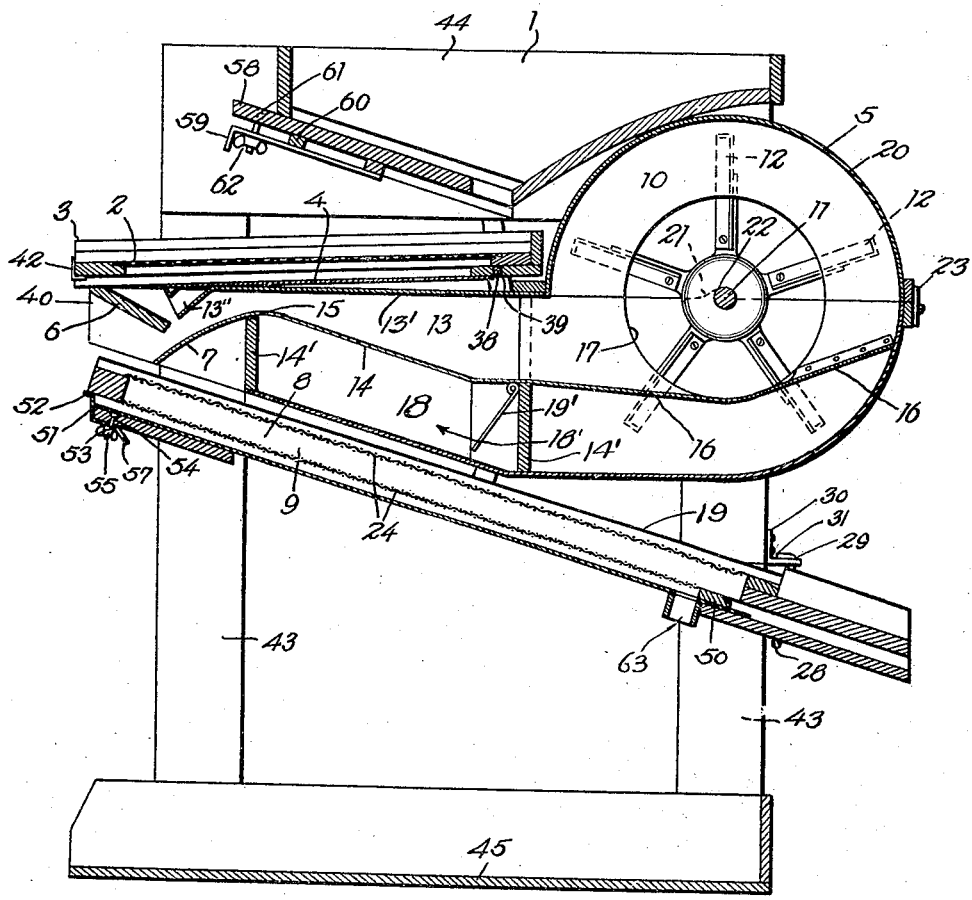
Figure 7:
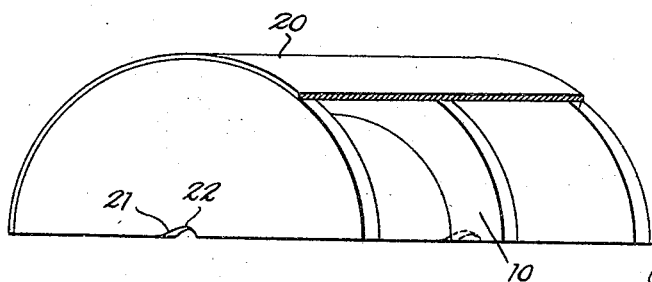
Figure 2:
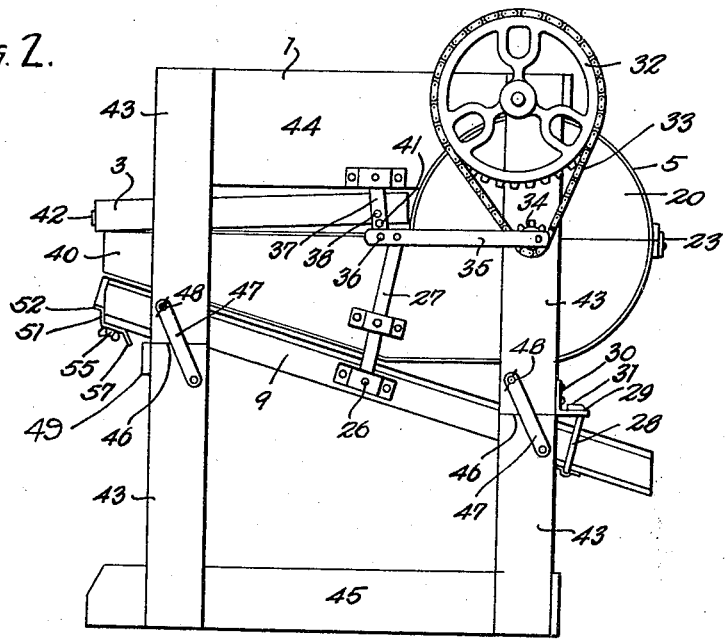
Figure 3:
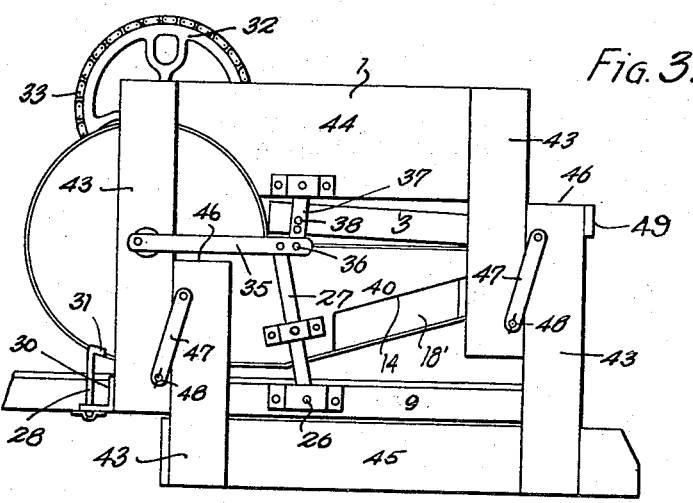

In the accompanying drawings, illustrating the invention, Figure 1 is a central vertical longitudinal section of the machine; Figure 2 is a side view of the machine; Figure 3 is a side view of the opposite side of the machine, showing the machine folded for compactness in shipping and storage; Figure 4 is a plan view partly broken away; Figure 5 is a detail perspective view of the strap metal bracket; Figure 6 is a detail view of the lower end of the lower shoe showing the hanger means therefor; Figure 7 is a detail perspective view of the upper removable section of the drum; Figure 8 is a detail view of the lower part of the upper shoe showing the screen retaining brackets; Figure 9 is a detail end view of the lower shoe.

In these drawings the numeral 1 designates the hopper for discharge of the grain or other material upon the upper chaff screen 2. The upper shoe 3 in which this screen is mounted has a screen board 4 thereunder below the discharge end of which is an inclined grain deflector 6 delivering the grain rearwardly upon an oppositely inclined grain deflector 7, the latter delivering the grain forwardly to the upper screen of the lower shoe 9, said lower shoe being inclined reversely to the upper shoe. The fan casing or drum 5 is mounted at one end of the machine and is divided centrally by a vertical partition 10, the transverse fan shaft 11 having the fan blades 12 located in one end portion or half of said drum between said partition and the side frame structure.

The operation of the fan creates a suction to cause the air to enter below the grain deflector 6 and between the same and the oppositely inclined grain deflector 7, thence passing into the longitudinal air duct 13, the free end of the bottom of which is formed by said grain deflector 7, the top 13' of said air duct having at its outer end a downturned lip 13" opposite to grain deflector 7 and forming therewith the mouth of the air duct and the bottom wall 14 thereof having an upwardly humped or curved portion 15 and a reversely bent rear end portion 16 continued into said drum at the end or half thereof opposite to that in which the fan is located and being located above the bottom wall proper of the said drum and on a level with the central opening 17 in said partition 10. Transverse frame members 14' support bottom wall 14. The grain discharged upon the oppositely inclined grain deflectors 6 and 7 will be retarded in its downward path and during this retardation will be exposed to the suction draught entering the mouth of the air duct, which will carry the lighter particles and impurities over the humped portion of the air duct into the said drum, whence they will be withdrawn through the central opening of the partition 10 into the fan chamber and thence discharged through discharge passage 18 in a direction directly opposite to that taken through the air duct into the fan casing, said discharge passage being located below the air duct and between the bottom of the same and the top of the lower shoe, the latter being covered by plate 19, the fine particles and impurities being driven out through lateral outlet opening 18' of said discharge passage at the side of the machine and well spaced apart from the grain discharge at the lower end of the lower shoe. An air deflector 19' is located in the discharge passage 18 and is adjustable to vary the draught, and may be provided with a thumb nut upon its pivot to fix the adjustment.

Owing to the fact that the fan blades extend transversely of the machine and longitudinally of said drum, it is possible to divide the drum longitudinally into two overlying halves, the upper semi-cylindrical half 20 being capable of being slid outwardly horizontally and removed. In sliding this upper half of the drum into and out of place, the fan blades will yield should they contact therewith, and at the end of the inward movement the said removable half is cammed upwardly by engagement of the cam edges 21 of the central bearing perforations 22 and will then drop by gravity said cam edges abutting against the cam shaft, to hold the drum half against accidental outward movement, a turn button 23 being employed to positively hold the drum against outward movement.

The cleaning of the grain or other material is effected by the upper and lower screens 24 of the lower shoe, said screens being fastened to the top and bottom sides of the screen frame 9 and said lower shoe being pivotally suspended at 26 intermediately of its length from the lower ends of the rocker levers 27 of which there are two, one at each side of the machine, the lower ends of said shoe being hung or suspended from hanger rods 28, the latter at their upper ends pivotally and slidably engaging perforations 29 of horizontal brackets 30 and having angularly turned free ends 31 resting upon said brackets.

The fan is driven by large gear wheel 32, having a chain belt connection 33 with pinion 34, the latter having a crank and pitman connection 35 with the upper end of one of said rocker levers, the pitman being extended beyond the rocker lever and at its inner end having pivotal connection at 36 with the lower end of a rocker link 37 by means of a transverse rod 38 connecting the lower ends of the rocker links at opposite sides of the machine. The fan shaft at its opposite end has a similar crank and pitman connection 35' with the opposite rocker lever, the pitman being similarly extended beyond the rocker lever and at its inner end having connection with the lower end of the opposite rocker link 37'. The upper shoe is provided at its inner end with open end slots 39 engaging the transverse rod 38, the outer end of said shoe resting and sliding back and forth upon the outer ends of the side boards 40 for the air duct and fan casing. The upper shoe may be readily lifted from engagement with said transverse rod and removed from the machine. The transverse rod 38 is adjustable to upper and lower positions in perforations 41 of said rocker links in order to give the shoe a greater or less inclination or pitch and a shorter or longer movement of reciprocation.

The chaff screen 2 of the upper shoe is held in place by the side walls and inner wall of the shoe and at its outer end is dropped into place behind sheet metal abutment corner brackets 42 of the shoe, forming a simple means for holding the screen in place. Said corner brackets engage horizontal slots 42' of the shoe.

In the reciprocation of the shoes, the hanger rods 28 take a fulcrum bearing at the terminal ends of their angularly bent upper end portions 31 upon the horizontal brackets 30 from which the hanger rods are hung to cause the forward or lower end of the screen to kick up at each rearward movement of reciprocation and to fall at each forward movement of reciprocation, thereby effecting a better cleaning of the grain or seed. In the rapid operation of the machine, the upward kick of the lower end of the shoe is higher, twice as high in fact than in slow operation. The frame of the machine includes end standards 43 at each side connected at the top by the hopper side boards 44, intermediately of their length by the side boards 40 of the fan casing and air duct, and at their lower ends by the open top base box 45. These standards 43 are divided intermediately of their length at 46, having each upper and lower end abutting sections connected together by pivoted links 47, whereby the entire machine, with the exception of said base box and the lower standard sections may be dropped or folded downwardly and forwardly to the position shown in Figure 3, the upper standard section folding in parallel to the lower standard sections, upon the lower pivots of said links as centers, thereby reducing materially the cubic contents of the machine and facilitating shipment and storage. In this folding, the clamp nuts 48 upon the upper pivots of the links being released, the upper part of the machine being pushed endwise and forwardly will ride off the lower standard sections and fall by gravity, the lower shoe at the same time folding upwardly and assuming a substantially horizontal position close to the side boards of the drum and air duct, due to the fact that the hanger rods 28 slidably engaging the perforations 29 permit the lower end of the shoe to rise the full length of said rods and the upper end of the shoe will slide forwardly from over the transverse frame bar 49 connecting the side boards 40 and located normally below the rear end of the shoe.

The screen frame 8 is slid readily into and out of place in the lower shoe owing to the fact that it slides in loose fitting seats located at the sides of the shoe, said seats being formed by the bottom of the shoe and the upper side by molding strips 9' on the sides of the shoe. The lower end of the screen frame is provided with a transverse bottom strip 50 which holds it upwardly against said molding strips and the upper end of the screen frame is held upwardly against the molding strips by means of a strap metal bracket 51 having an out-turned upper end 52 bearing against the screen frame and an in-turned lower end having a slot 53 engaging a bolt 54 of the bottom of the shoe, said bolt having a thumb nut 55 to fix the adjustment. Upon release of said thumb nut the bracket may be slipped downwardly beneath the shoe bottom, to admit of ready insertion and removal of the screen frame due to the fact that the bolt engages the slot 53 of the bracket admitting of endwise movement of the bracket and to the fact that the free end of the lower flange or end of the bracket is down-turned at 57.

The hopper has a bottom slide gate 58 which is adjusted outwardly and inwardly by means of a hopper rod 59, said rod being of considerable length and midway of its length bearing against a transverse abutment strip 60 secured to the hopper sides. A downwardly projecting clamp bolt 61 is carried by said slide gate and engages a perforation at the outer or free end of the hopper rod whereby when the thumb nut 62 of said bolt is tightened the free end portion of the hopper rod will take a bearing against said strip 60 and be sprung upwardly to draw said slide gate downwardly into strong frictional engagement with the top of said abutment strip and to draw said hopper rod upwardly into strong frictional engagement with the bottom of said strip, the result being that the slide gate is held stationary against displacement in any position of adjustment.

The upper and lower screens of the lower shoe discharge at the lower end of the shoe at opposite sides thereof into suitable receptacles placed thereunder, and the smaller seed or grain passing through both screens are discharged through lower spout 63 of said shoe into the base box 45. The upper shoe discharges the chaff at the opposite end of the machine.

I claim:—

1. In a grain and seed cleaner, upper and lower vibratory shoes having screens, a transverse drum having at one end thereof an air inlet chamber and at the opposite end a fan chamber horizontally and transversely aligned and communicating therewith, a longitudinal air duct located between said shoes and having its mouth adjacent the approximated ends of said shoes, and at its inner end communicating with said air inlet chamber, and a fan located in said fan chamber, the latter having a discharge passage located between said shoes and discharging laterally of the machine.

2. In a grain and seed cleaner, an inclined vibratory screen, a transverse drum having a partition dividing the same into two horizontal chambers and provided with an opening establishing communication therebetween, a longitudinal air duct located below and having its mouth adjacent the lower end of said screen and at its inner end communicating with one of said chambers, and a fan located in the other chamber.

3. In a grain and seed cleaner, a hopper, an inclined vibratory screen, a transverse drum located below and close to the bottom of said hopper and having a partition dividing the same into two horizontal chambers and provided with an opening establishing communication therebetween, a longitudinal air duct located below and having its mouth adjacent the lower end of said screen and at its inner end communicating with one of said chambers, and a fan located in the other chamber, said drum having upper and lower overlying sections, one of which is horizontally slidable and removable.

4. In a grain and seed cleaner, upper and lower vibratory shoes having screens, a transverse drum having a central transverse partition dividing the same into two horizontal chambers and provided with an opening establishing communication therebetween, a longitudinal air duct located between and having its mouth located adjacent the approximated ends of said shoes, and having a bottom provided with an inclined free end portion forming a grain deflector, said air duct at its inner end communicating with one of said chambers, an oppositely inclined grain deflector located adjacent the mouth of said air duct and discharging upon the said free end portion of said bottom, and a fan located in the other drum chamber, said air duct having a bottom provided with a humped portion adjacent its free end and a reversely bent inner end portion.

5. In a grain and seed cleaner, a shoe having a screen, suspension means for said shoe, and means for vibrating said shoe, said suspension means including horizontal brackets having perforations and hanger rods for the lower end of the shoe engaging said perforations and having angularly bent upper ends having a fulcrum bearing upon said brackets to cause the shoe to kick upwardly in its vibration.

6. In a grain and seed cleaner, a shoe having a screen, and means for vibrating said shoe including rocker levers from which said shoe is suspended at points intermediate of its length, horizontal brackets having perforations, and hanger rods for the lower end of said shoe engaging said perforations and having angularly bent upper ends having a fulcrum bearing upon said brackets to cause the shoe to kick upwardly in its vibration.

7. In a grain and seed cleaner, a vibratory shoe having screens, means for vibrating said shoe including horizontal brackets having perforations and hanger rods for the lower end of said shoe engaging said perforations and having a fulcrum bearing upon said brackets, two main supporting standards at each side of the machine each composed of upper and lower end abutting sections having a link connection, the entire machine with the exception of said base and the lower standard sections being foldable downwardly to fold said upper sections in parallel to the lower sections and said lower shoe upwardly into close relation to said base to the extent of the length of said hanger rods the latter being slidable in said perforations to facilitate the folding.

8. In a grain and seed cleaner, upper and lower vibratory shoes having screens, a transverse drum having a fan chamber, a longitudinal air duct located between and having its mouth adjacent the approximated ends of said shoes and at its inner end communicating with said transverse fan chamber, and a fan in said fan chamber, the latter having a discharge passage located between the bottom of said air duct and the top of the lower shoe and having an outlet opening at one side of the machine.

9. In a grain and seed cleaner, upper and lower vibratory shoes having screens, a transverse drum at one end of the machine having a fan chamber, a longitudinal air duct located between and having its mouth at the other end of the machine adjacent the approximated ends of said shoes and at its inner end communicating with the transverse fan chamber, and a fan in said chamber, the latter having a discharge passage provided with an outlet at one side of the machine, and vibrating mechanism for the shoes including a gear wheel provided with an operating crank at the other side of the machine.

10. In a grain and seed cleaner, a vibratory shoe having a screen frame and a loose fitting seat therefor including a bottom plate and upper lateral molding strips, and means for raising said screen frame into contact with said molding strips, to facilitate the insertion and removal of said frame and leave a space below said frame between the lower screen thereof and the bottom of said shoe, including a vertically adjustable bracket at the outer end of the shoe, the shoe being provided with a bolt, and the bracket having a lower in-turned portion having a slot engaging said bolt, said in-turned portion having a downwardly bent end.

In testimony whereof I affix my signature.

JOHN H. PENNY.